F. A. GUNKELMANN, Dec'd.

W. F. GUNKLEMAN, Administrator.

SPRING VEHICLE.

No. 11,490. Reissued Apr. 23, 1895.

Witnesses.
E. Byrn Gilchrist.
C. H. Dorsey

Inventor.
Frank A. Gunkelmann.
By Leggett & Leggett.
Attorneys.

THE NORRIS PETERS CO., PHOTO-LITHO., WASHINGTON, D. C.

UNITED STATES PATENT OFFICE.

FRANK A. GUNKELMANN, OF MEDINA, OHIO; WILLIAM F. GUNKLEMAN ADMINISTRATOR OF SAID FRANK A. GUNKELMANN, DECEASED.

SPRING-VEHICLE.

SPECIFICATION forming part of Reissued Letters Patent No. 11,490, dated April 23, 1895.

Original No. 438,543, dated October 14, 1890. Application for reissue filed October 30, 1891. Serial No. 410,694.

*To all whom it may concern:*

Be it known that I, FRANK A. GUNKELMANN, of Medina, in the county of Medina and State of Ohio, have invented certain new and useful Improvements in Spring-Vehicles; and I do hereby declare the following to be a full, clear, and exact description of the invention, such as will enable others skilled in the art to which it pertains to make and use the same.

My invention relates to improvements in spring-vehicles; and it consists in certain features of construction and in combination of parts hereinafter described, and pointed out in the claims.

Figure 1:
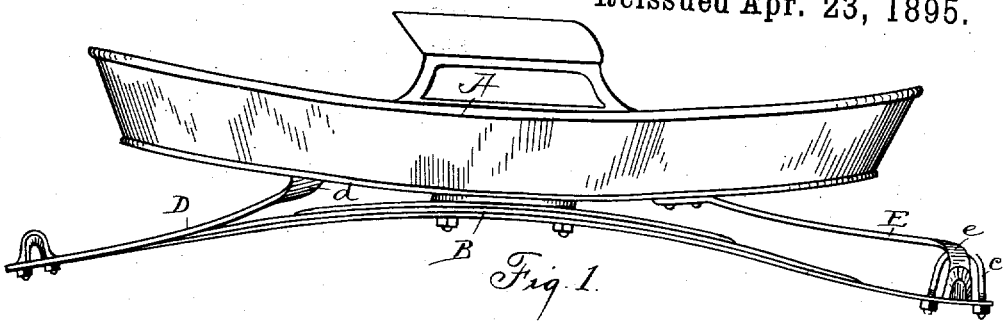
Figure 2:
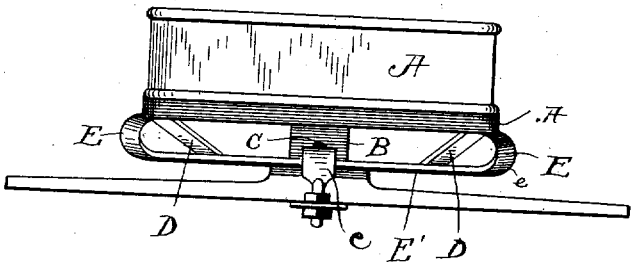
Figure 3:
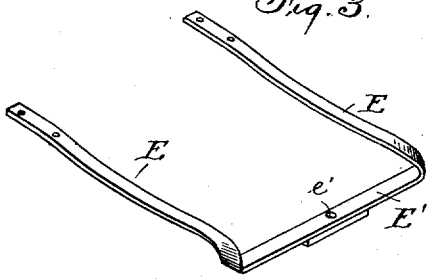
Figure 4:
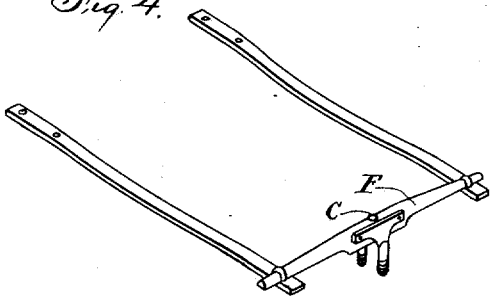
Figure 5:
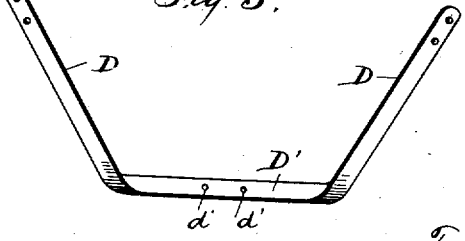

In the accompanying drawings, Figure 1 is a side elevation. Fig. 2 is a front end elevation. Figs. 3 and 4 are views in perspective of the equalizing or balancing-spring detached. Fig. 5 is a plan of rear equalizing-spring.

A, represents the body of the vehicle, to which at the longitudinal and lateral center thereof is attached the principal spring B of the variety shown. The extremes of this spring extend under either axle, the spring being secured to the rear axle in the usual manner by means of a clip. The forward end of spring B is pivotally secured to the forward axle by means of a king-bolt C, the latter also extending through the cross-bar above, such construction serving for or in place of the ordinary fifth-wheel. These parts are further secured by a clip, *c*, the latter embracing the cross-bar, and the bolt-ends of the clip being separated far enough to allow the forward axle to swing the limited distance necessary.

D and E, are the equalizing or balancing-springs. One or both of these springs are constructed each of a single flat bar or leaf of spring-steel folded diagonally, as shown at *e* and *d*, to form approximately a U-shaped spring. A balancing-spring thus folded cannot only be cheaply made, but possesses great strength and durability. The central member D′ of spring D is provided with holes *d′* for securing this member to the under side of the body-cross-wise thereof, the free ends of the spring extending under the rear axle, to which they are secured by clips. The central member E′ of spring E may serve as a cross-bar in which case the central portion of this member should be blocked, as shown in Fig. 3, the ends of the spring being secured to the under side of body A near the sides of the latter. Hole *e′* is for the king-bolt. In case it is preferred to use a wooden cross-bar in front, the forward equalizing-spring might be a fac-simile of the rear spring D, the manner of attaching such spring to cross-bar F being shown in Fig. 4. The chief function of the equalizing or balancing-spring is to prevent the vehicle body from rocking sidewise and in a measure to prevent the body from rocking endwise and to hold the body steady without affecting the easy riding qualities of the vehicle. These springs also help to sustain the load, and to this extent relieve the strain on spring B, and more especially they relieve spring B from torsional strain.

What I claim is—

1. In a spring vehicle, the combination, with vehicle-body and longitudinally centrally-located spring, of equalizing or balancing-springs secured to the opposite ends of the body and to the axles, one of said springs constructed of a flat bar or leaf of metal, bent substantially as shown, the central member being fastened crosswise to the under side of the vehicle body and the ends to the axle, and the other spring formed, substantially as shown, with its ends secured to the vehicle body, and the central member constituting a cross-bar having a hole adapted to receive the king-bolt, substantially as set forth.

2. The combination, with the body of a vehicle and longitudinal centrally-located spring, of balancing or equalizing-springs secured to the body and to the axles or cross-bar, said springs composed of a flat bar or leaf of metal bent into three members, the central member of which is in a different plane from the other two members and formed by bending the end members across the central member, substantially as set forth.

3. In a spring vehicle, the combination with a vehicle body and a longitudinal a balancing or equalizing spring secured to the body and to the axle or cross bar, the said balancing or equalizing spring being composed of a bar or leaf of metal bent into three members the central member of which is in a different plane from the other two members and formed by bending the end members across the central member.

In testimony whereof I sign this specification, in the presence of two witnesses, this 12th day of October, A. D. 1891.

FRANK A. GUNKELMANN.

Witnesses:
C. H. DORER,
WARD HOOVER.